United States Patent
Jodh

(10) Patent No.: US 7,814,471 B2
(45) Date of Patent: Oct. 12, 2010

(54) METHOD AND APPARATUS FOR PROVIDING DLL COMPATIBILITY

(75) Inventor: Santosh Sharad Jodh, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 817 days.

(21) Appl. No.: 11/016,505

(22) Filed: Dec. 16, 2004

(65) Prior Publication Data

US 2006/0136890 A1      Jun. 22, 2006

(51) Int. Cl.
G06F 9/44      (2006.01)
(52) U.S. Cl. .................................... 717/163; 719/331
(58) Field of Classification Search ............... 717/163; 719/331
See application file for complete search history.

(56) References Cited

U.S. PATENT DOCUMENTS

| | | | | |
|---|---|---|---|---|
| 5,634,114 A | * | 5/1997 | Shipley | 717/170 |
| 5,673,315 A | * | 9/1997 | Wolf | 705/59 |
| 5,953,534 A | * | 9/1999 | Romer et al. | 717/138 |
| 5,974,470 A | * | 10/1999 | Hammond | 719/331 |
| 6,412,071 B1 | * | 6/2002 | Hollander et al. | 726/23 |
| 6,629,111 B1 | * | 9/2003 | Stine et al. | 707/205 |
| 7,225,430 B2 | * | 5/2007 | Eatough et al. | 717/127 |
| 2003/0212913 A1 | * | 11/2003 | Vella | 713/202 |

* cited by examiner

Primary Examiner—Wei Y Zhen
Assistant Examiner—Phillip H Nguyen
(74) Attorney, Agent, or Firm—Wolf, Greenfield & Sacks, P.C.

(57) ABSTRACT

A method and apparatus include comparing a called DLL file with DLL file names listed in a database. If a file name of the called DLL file is one of the DLL file names listed in the database, a compatibility mode associated with a DLL file name that matches the called DLL file is referenced. Based on the referenced compatibility mode, an operation of a processor is affected using the compatibility mode associated with the DLL file name.

19 Claims, 3 Drawing Sheets

| DLL NAME | DATABASE ATTRIBUTES | COMPATIBILITY MODES |
|---|---|---|
| RUNTIME.DLL | FRIENDLY SOFT INC. VERSION 3.0 10-04-2004 | TURN OFF EXECUTE PROTECTION |
| SEND.DLL | MAIL SYSTEMS CORP. VERSION 4.6 | PAD MEMORY ALOCATION |
| ... | ... | LIE ABOUT VERSION |
| XXX.DLL | YYYYY | ZZZZZ |

Fig. 3.

METHOD AND APPARATUS FOR PROVIDING DLL COMPATIBILITY

FIELD OF THE INVENTION

The present invention generally relates to methods and apparatus for managing files within computer systems. More particularly, the present invention relates to methods and apparatus used to ensure the proper execution of computer code.

BACKGROUND OF THE INVENTION

As technology advances, computers provide increasingly useful and rapid service to their users. Much of the advantage provided by computers, however, arises as a derivative of the increased processing speed, that is, the ability to run larger and more complex programs. Of course, many tasks performed by a computer, such as clearing a display of graphics, connecting to a network, etc., are repetitive. Thus, one method of simplifying the job of programming is to re-use software routines as much as possible. As software continues to evolve, then, and programs become more complex, increasingly reliance is placed on the re-use and recycling of various modules that support application program operations. Software modules or subroutines that are routinely used by other programs are often grouped into a single program file, known as a "library."

Using the Microsoft Windows™ operating system (hereinafter "Windows™") as a well-known example, it is understood by those skilled in the art that a popular library file type can be recognized in a file listing by the appended designation characters "DLL." Those who formulate these dynamic link library files, or "DLL files" often intend that they be used by many different programs. Similar to other popular types of software programs, DLL files are subject to constant improvement and upgrades. Moreover, as is often the case with other types of software programs, upgrades for DLL files are typically published under a new version number, have an updated creation date, may include a version check sum, etc.

To further elaborate, an application program might make use of a DLL file having the name "DRIVE.DLL." This library may be published, upon initial release, with a version number of "1.0." Minor upgrades or changes to version 1.0 may in turn be published with a version number of "1.05" or "1.1." These minor upgrades or changes to the DLL file may include small revisions to the DLL file code to improve the functionality of the program, or possibly to correct minor flaws in operational functionality. Major changes to the DLL file will usually be accompanied by a greater numerical change in the version number. Therefore, by tracking the version number attached to any particular software code or library, it is possible to gain an idea as to whether the most recent version of the software is being used. More importantly, observing the version number attached to the software code will also give information as to whether the correct version of the code is being used.

Similarly, tracking other attributes of a DLL file may also indicate whether the correct version of the code is being used. For example, a creation date of a DLL file may be referenced in order to determine if the correct DLL file is being used. Furthermore, other attributes identifiable within DLL files may be used in order to determine whether a correct version of the DLL file is being used.

Most software application programs make use of auxiliary software codes, including libraries, such as the exemplary DLL files described above. One of the most common problems when using such software codes is loading an improper version of the code by the application software, which may occur in several different ways. For example, one application may load one version of a DLL file, while another instance of the same application loads a different version of the same DLL file. Alternatively, a single application may load a DLL file version that differs from a previously-loaded version. Either occurrence may cause the application to perform erroneously. Such erroneous behavior may hamper the usability of the application that loaded the DLL file.

Computer processors used today are firmware programmed to handle executable code that may cause an operating system and/or application to behave in an undesirable manner. For example, an application that attempts to load a DLL file that is not intended therefore, or that is a DLL file that is intended for an older version of the application, may cause a processor to unexpectedly halt a processing operation if an attempt is made to execute code out of data memory. If this occurs, an operating system running in conjunction with the processor may not continue to operate properly. Oftentimes, the operating system will need to be restarted in order to reestablish the proper interface between the operating system and the processor. To prevent this undesirable behavior by an operating system, processors are now robust and can handle out of date DLL files, erroneous DLL files, or otherwise misbehaving code before the actual operation of the operating system is affected.

In some cases, an operating system and/or invoking application will analyze an out of date or erroneous DLL file before it is actually executed. This occurs, for example, if an operating system and/or an invoking application determines the called DLL file has a different version number. If the processor finds that the DLL file is not that which is expected by the operating system and/or invoking application, loading or execution of the DLL file is simply abandoned. Although this does not render the interface of the operating system inoperative, the result is nonetheless undesirable to the user. In particular, often the result is the incorrect operation of the application that attempted to launch the DLL file.

Since the occurrence of application programs attempting to use (or re-use) commonly available auxiliary software codes is increasing, such as, for example, the DLL files provided for use with Windows™, there remains a need to determine and identify DLL files that are operational with current operating systems and processors, but yet are otherwise considered out of date.

SUMMARY OF THE INVENTION

An exemplary embodiment to the present invention provides a compatibility database listing various DLL file names, DLL attributes and compatibility modes that may be used by a computer system to determine if a called DLL file may be properly executed by an initiating application software program. When an application initiates a DLL call, the requested DLL file is compared with known DLL files listed in a DLL compatibility database. If the called DLL file is referenced in the DLL compatibility database, associated compatibility modes may be used by the operating system and processor of a computer system in order to provide stable execution of the called DLL file. If the called DLL file is not referenced in the DLL compatibility database, then the operating system and processor will operate in a conventional manner. For example, if the called DLL file is found to be an older version and potentially incompatible with the requesting software application, the processor being utilized by the operating system may issue an exception and terminate execution of the called DLL file. Although not always the case, if the processor fails to load the requested DLL file, this may result in a fatal error that requires reinitialization of the operating system, or the like.

According to an exemplary embodiment of the present invention, a method includes detecting a software code call; comparing information associated with the called software code with software code information stored in a database; and causing a processor to function in a particular manner if the information associated with the called software code is associated with at least some of the software code information stored in the database.

According to another exemplary embodiment of the present invention, an article of manufacture is provided for use in programming a processor, the article of manufacture comprising at least one computer readable storage device including at least one computer program embedded therein that causes the processor to perform at least one exemplary embodiment of the present invention.

According to yet another exemplary embodiment of the present invention, a method includes comparing a called DLL file with DLL file names listed in a database. If a file name of the called DLL file is one of the DLL file names listed in the database, a compatibility mode associated with a DLL file name that matches the called DLL file is referenced. Based on the referenced compatibility mode, an operation of a processor may be affected using the compatibility mode associated with the DLL file name.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 3 is a conceptual diagram of an exemplary database and its contents that is representative of a DLL compatibility database in accordance with an exemplary embodiment of the present invention.

DETAILED DESCRIPTION OF THE EXEMPLARY EMBODIMENTS

The exemplary embodiments of the present invention include an apparatus and method for providing a DLL compatibility database that provides for the use of DLL files that may otherwise be excluded from operation by today's advanced processors. Within the discussions herein, the "application program" refers to an executable code program that is compiled and linked and is used to execute an application. In the course of its execution, the application program may call subroutines within a DLL file. The present invention can operate effectively on a desktop or general purpose computer system. An exemplary computer system is described herein.

Although the description of the present invention references the use of DLL files, those of ordinary skill in the art appreciate that other library files may be used in conjunction with the exemplary embodiments of the present invention. In particular, it is clear that the DLL compatibility database described herein may also accommodate other library files other than the DLL files described herein. For example, a "software code" is any set of executable instructions, or set of software subroutines, similar to or identical to a DLL file, which can be loaded into a computer memory under the direction of an application program. A software code may be in the form of source code or object code.

This document may also refer to software code as being "improper software code." In general, an improper software code is any software code other than that which is specified (either directly or indirectly) by an application program and/or operating system when it prepares to use the called upon software code. Therefore, while there may be nothing wrong with the improper software code in and of itself, it has been deemed an "improper software code" simply because the detailed attributes of the code do not match that which is expected by the requesting application program and/or operating system.

Figure 1:
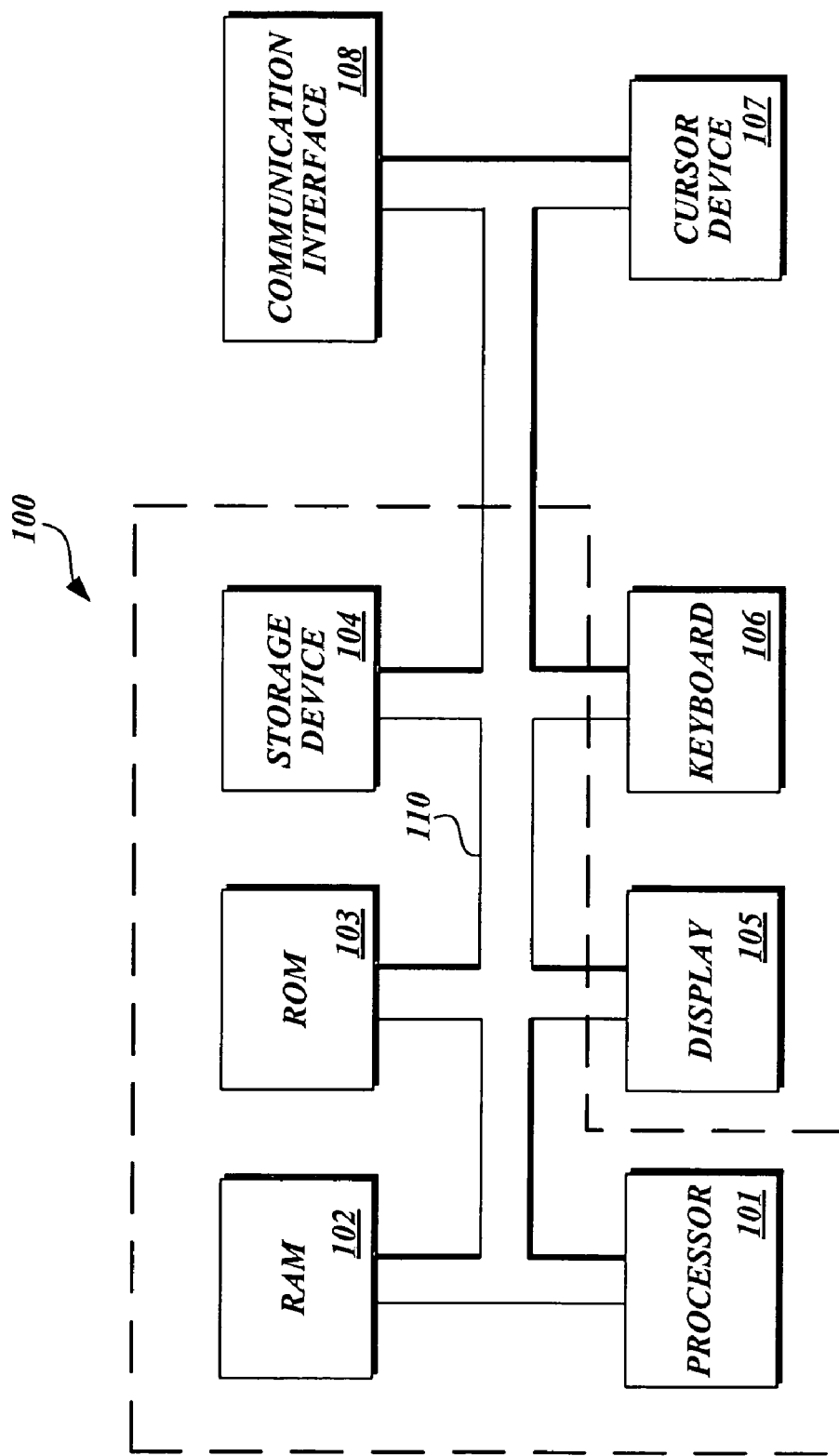
FIG. 1 is a logical block diagram of a general purpose computer system suitable for executing an exemplary embodiment of the present invention.

FIG. 1 illustrates a general computer system 100 within which the exemplary embodiments of the present invention can operate. The computer system 100 is capable of executing an application program and a DLL file. Furthermore, the general purpose computer system 100 is capable of operating other application programs that use software code that is substantially similar to DLL files.

In general, computer systems, such as the general purpose computer system 100 that may be used by the exemplary embodiments of the present invention, include a bus 110 for communicating information to the various components of the computer system 100. A central processor (CPU) 101 is coupled to the bus 110 for processing information and instructions necessary to provide functionality for the computer system 100. The computer system 100 further includes a random access memory (RAM) 102 coupled with the bus 110 for storing information and instructions for the CPU 101, and a read only memory (ROM) 103 coupled with the bus 110 for storing static information and instructions for use by the CPU 101. Further included is a data storage device 104, such as a magnetic disk drive, an optical disk drive, or the like, that is coupled with the bus 110 for storing information and instructions that may be used by the CPU 101. The system 100 further includes a display device 105 coupled to the bus 110 for displaying information to a user of the system 100. An alphanumeric input device 106, such as a keyboard, may be coupled to the bus 110 to provide for inputting information that may be used by the CPU 101 to perform a function with the computer system 100. The computer system 100 may also include a cursor device, such as a mouse, for allowing additional input and control of the computer system 100. Similar to the other elements of the computer system 100, the keyboard 106 and the cursor device 107 are coupled to the bus 110. Finally, the computer system 100 may include a communication interface 108 that may be used to provide for linking of the computer system 100 to a network such as the Internet.

The CPU 101, RAM 102 and/or ROM 103 may be enabled with code for performing the exemplary embodiments of the present invention. Additional elements of the computer system 100 may also be enabled with code for performing the exemplary embodiments of the present invention. Those having skill in the art will readily appreciate that other similar devices used with computer systems may also be enable to perform the exemplary embodiments of the present invention.

Figure 2:
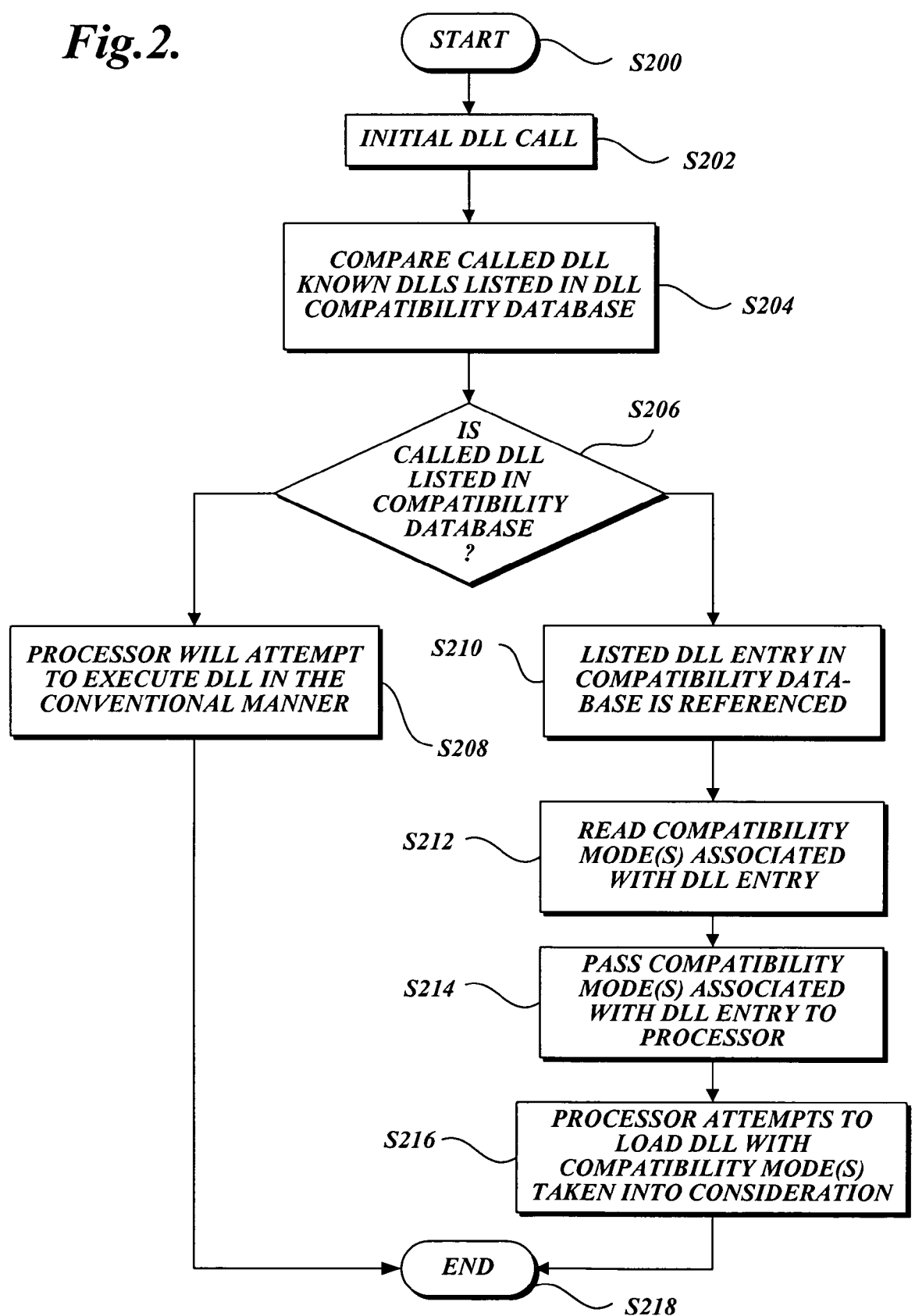
FIG. 2 illustrates process steps that may be used to access a DLL compatibility database in accordance with an exemplary embodiment of the present invention.

FIG. 2 illustrates a process that may be used when an application program makes a DLL call. Block S200 generally illustrates the beginning of the process illustrated in FIG. 2. Often, when a user of a computer system, such as the computer system 100 illustrated in FIG. 1, launches an application program, that application program will make one or more DLL file calls (S202). According to an exemplary embodiment of the present invention, when a DLL file is called, it will be compared to a list of known DLL files provided in a DLL compatibility database (S204). The details of a DLL compatibility database according to an exemplary embodiment of the present invention will be discussed hereinafter with reference to FIG. 3.

To determine if the DLL file is listed in the DLL compatibility database, as is conventional with most database technologies, the called database filename may be cross-referenced with all the DLL names listed in the database; and/or the attributes of the called DLL file may be compared with known attributes of listed DLL files within the database.

If the called DLL file is found within the compatibility database (S206), a reference associated with the called DLL file is reviewed (S210). In particular, the compatibility mode(s) associated with the called DLL files is taken into consideration (S212). The one or more compatibility modes found in the compatibility database are then passed to the processor, such as the CPU 101 of the computer system 100, for consideration thereby (S214). In particular, the processor will attempt to load the called DLL file into memory, such as RAM 102 of the computer system 100, while taking into consideration the compatibility modes that are associated with the called DLL file (S216).

On the other hand, the called DLL file may not be listed in a compatibility database (S206). If this is the case, the processor will attempt to execute the called DLL in a conventional manner. That is, the processor may exclude use of the called DLL file if it is incompatible with the calling application program and/or the operating system. Block S218 generally represents the end of the process illustrated in FIG. 2.

Turning now to FIG. 3, a conceptual diagram of an exemplary database 300 and its content which may be used when a DLL file call is made can be seen. In accordance with an exemplary embodiment of the present invention, the DLL compatibility database 300 includes a DLL file name column 310, an attributes column 312, and a compatibility modes column 314.

The contents of the DLL file name column 310 includes various DLL files that have been identified as having associated improper software code. As was referred to previously in this document, improper software code is considered any software code that functions in an otherwise acceptable manner except for the code may include an attribute that does not agree with that which is expected by an application program, operating system, or processor that is launching the DLL file. For example, the called DLL file may expect a specific version number that is not the one that is provided by the operating system. Some DLL files include code that searches for a current version of the operating system, invoking application, etc., and compares the current version with a version that is expected by the code. Normally, without the use of the DLL compatibility database according to the exemplary embodiments of the present invention, a successful execution of the called DLL file may not occur. In particular, a processor my exclude or prevent the execution of the called DLL file because the version number of the operating system, invoking application, etc., does not match the version number that is expected by the DLL file.

Returning to FIG. 3, as is illustrated the DLL file name column 310 includes various DLL file names that have been found to operate correctly even though the referenced files likely include improper software code. Attributes listed in the attributes column 312 may be used when referencing the database 300 to determine if the called DLL file may be trusted by the application program invoking the referenced DLL file within the database 300. The attributes listed in the attributes column 312 may include the manufacturer, the version, a creation date, etc. associated with a called DLL file. The attributes listed in the attributes column 312 may be used to verify the called DLL file is valid.

Virus and worm files often duplicate the file names of authentic DLL files, but these duplicated malicious DLL files often do not have the attributes of the authentic DLL files. Using the attributes listed in the attributes column 312, the exemplary embodiments of the present invention often identify malicious DLL files even when they have the same file name as the authentic DLL files they replaced. If a called DLL file has a DLL file name associated in the compatibility database 300, but the called DLL file does not have attributes that match those associated with the DLL file name listed in the database 300, the compatibility mode(s) associated with the DLL file name listed in the database 300 will not be passed on to the processor. In particular, the processor will continue to operate in a conventional manner, which may result in the processor excluding execution of the called DLL file.

The particular compatibility modes listed in the compatibility modes column 314 will now be discussed. The compatibility modes provide instructions to a computer system processor as to how to execute a particular DLL referenced within the compatibility database 300. For example, if an application program calls the "RUNTIME.DLL" listed in the compatibility database 300, the processor of the computer system will be instructed to allocate 16 bytes of additional memory (Pad Memory Allocation) each time the RUNTIME.DLL file allocates memory. Additionally, the processor will be instructed to turn off whatever execute protection is enabled by the processor. The two compatibility modes associated with the RUNTIME.DLL file are merely exemplary. In particular, any number of compatibility modes may be associated with any given DLL file.

The various compatibility modes that may be associated with DLL files listed in the compatibility mode database 300 are: Lie About Version, Pad Memory Allocation, Ignore Memory Free/Delay Memory Free, Turn Off Execute Protection, Boost Thread Priority, and/or Hide Cursor. One or more of these specific compatibility modes may be used to actuate specific performance of a processor and/or operating system. Moreover, additional compatibility modes may also be included within the compatibility mode database 300. The present invention is not limited to the compatibility modes discussed in this document.

Exemplary Use of Present Invention

Some computer viruses and worms take advantage of buffer overflows by generating malicious code in memory and then executing the generated coded. Processor technology is capable of preventing execution of software code, such as DLL files, that allow this type of activity (e.g., executing code in a data segment). However, there are a large number of existing DLL files that execute code in data segments. Although these existing DLL files may be considered improper software code, they are often needed ensure proper operation of various legacy application programs. The use of a compatibility database in accordance with the exemplary embodiment of the present invention allows for execution of otherwise processor excluded software code (DLL files).

Although specific exemplary embodiments have been illustrated and described herein, it will be appreciated by those of ordinary skill in the art that any arrangement which is calculated to achieve the same purpose may be substituted for the specific exemplary embodiments shown and discussed. These applications are intended to cover any and all adaptations or variations of the present invention. It is also to be understood that the above description has been made in an illustrated fashion, and not in a restrictive one. Combinations of the above exemplary embodiments, and other exemplary embodiments not specifically described herein, will be apparent to those of skill in the art upon reviewing the above description. The scope of the present invention includes any other applications in which the above methods and structures are used. Therefore, the scope of the present invention should be determined with reference to the appended claims, along with the full range of equivalents to which such claims are entitled.

The embodiments of the invention in which an exclusive property or privilege is claimed are defined as follows:

1. A method, comprising:
   detecting a call from an application to a dynamic link library (DLL) file, wherein the called DLL file is out-of-date and is different from a DLL file expected by the application;
   comparing the called DLL file with a list of DLL files stored in a database by comparing information associated with the called DLL file, the information including at least one attribute comprising at least a version number and a manufacturer of the called DLL file, to information stored in the database comprising the list of DLL files, wherein the database is separate from the called DLL file;
   based on the comparing, determining whether the at least one attribute of the called DLL file matches at least one attribute of at least one DLL file from the list of DLL files in the database;
   when the at least one attribute of the called DLL file matches the at least one attribute of the at least one DLL file listed in the database, utilizing at least one compatibility mode associated with the at least one DLL file listed in the database to properly execute the called DLL file by the application, wherein the at least one compatibility mode provides at least one instruction to a processor as to how to execute the called DLL file, the at least one instruction causes allocation of additional memory when the called DLL file allocates memory; and
   when the at least one attribute of the called DLL file does not match the at least one attribute of the at least one DLL file listed in the database, causing the processor to exclude execution of the called DLL file.

2. The method according to claim 1, wherein the application comprises a software application.

3. The method according to claim 1, wherein the comparing step includes comparing information associated with the called DLL file to information associated with the at least one DLL file of the DLL files listed in the database and known attributes of the at least one DLL file listed in the database.

4. The method according to claim 3, further comprising searching the database for a DLL file using a DLL file name matching the called DLL file, and, when the DLL file is found in the database, referencing the at least one known compatibility mode associated with the DLL file found in the database to a mode associated with the called DLL file.

5. The method according to claim 4, wherein the referencing step includes using the at least one known compatibility mode associated with the DLL file found in the database to affect the processor to execute the called DLL file in a particular known manner.

6. The method according to claim 5, wherein the at least one known compatibility mode is used by a current version of an operating system executed by the processor to cause the processor to believe that another version of the operating system is currently in use for the processor to execute the called DLL file in a particular known manner.

7. The method according to claim 5, wherein the at least one known compatibility mode is used to cause the processor to allocate additional memory each time the called DLL file allocates memory.

8. The method according to claim 5, wherein the at least one known compatibility mode is used to cause the processor to stop processing execute protection code of the called DLL file, the execute protection code of the called DLL file being designed to prevent software code from executing in data segments.

9. An article of manufacture for use in programming a processor, the article of manufacture comprising at least one computer readable storage device including at least one computer program embedded therein that causes the processor to perform the method of claim 1.

10. A method, comprising:
    comparing a file name of a called dynamic link library (DLL) file, called by an application, with DLL file names listed in a compatibility database separate from the called DLL file, wherein the called DLL file is out-of-date and is different from a DLL file expected by the application, wherein each DLL file name from the DLL files names is associated with at least one attribute and at least one compatibility mode, and wherein the at least one attribute comprises a manufacturer of the DLL file;
    when the file name of the called DLL file matches with at least one file name of the DLL file names listed in the compatibility database;
    obtaining a known compatibility mode associated with the DLL file name from the compatibility database that matches the called DLL file, wherein the compatibility mode ensures proper execution of the called DLL file by a processor;
    passing the known compatibility mode to the processor, wherein the known compatibility mode associated with the DLL file name found in the compatibility database provides at least one instruction to the processor as to how to execute the called DLL file; and
    when the file name of the called DLL file does not match the at least one file name of the DLL file names listed in the compatibility database, causing the processor to exclude execution of the called DLL file.

11. The method according to claim 10, wherein an operating system affects the operation of the processor using the known compatibility mode associated with the DLL file name found in the compatibility database.

12. The method according to claim 11, wherein the known compatibility mode is at least one an instruction used by the operating system to indicate that a current version of the operating system is different from an actual version of the operating system.

13. The method according to claim 10, further comprising, when the file name of the called DLL file is one of the DLL file names listed in the compatibility database, comparing attributes of the called DLL file with at least one attribute associated with the DLL file name in the compatibility database that matches the called DLL file name.

14. The method according to claim 13, wherein referencing the known compatibility mode occurs only if the compatibility database includes the DLL file name of the called DLL file and the called DLL file has an attribute that matches the at least one attribute associated with the DLL file name in the compatibility database.

15. A method, comprising:

detecting a call to a dynamic link library (DLL) file made by at least one application or an operating system, wherein the called DLL file is out-of-date and is different from a DLL file expected by the at least one application or the operating system;

comparing information associated with the called DLL file, the information including a file name of the called DLL file and at least one attribute comprising at least a version number of the called DLL file, to information associated with at least one DLL file from a list of DLL files stored in a database separate from the called DLL file, wherein the information associated with the at least one DLL file from the list of DLL files comprises a file name of the at least one DLL file, at least one attribute associated with the file name of the at least one DLL file and comprising a manufacturer of the at least one DLL file, and at least one compatibility mode associated with the file name of the at least one DLL file;

when the file name of the called DLL file matches the file name of the at least one DLL file from the list of DLL files in the database and the at least one attribute of the called DLL file matches the at least one attribute associated with the file name of the at least one DLL file, utilizing at least one instruction to a processor provided by the at least one compatibility mode associated with the file name of the at least one DLL file to properly execute the called DLL file by the processor; and when the file name of the called DLL file does not match the file name of the at least one DLL file from the list of DLL file names in the database, causing the processor to exclude execution of the called DLL file.

16. The method according to claim 15, wherein the database comprises a precompiled database of the list of the DLL files, and the at least one compatibility mode provides the at least one instruction to the processor with respect to the execution of the DLL file of the DLL files.

17. The method according to claim 1, wherein the at least one instruction accommodates for at least one difference between one or more attributes of the least one application or the operating system and one or more attributes expected by the called DLL file.

18. The method according to claim 17, wherein the one or more attributes of the least one application or the operating system comprise a version number of the least one application or the operating system.

19. The method according to claim 13, further comprising, when the name of the called DLL file does not match the file name of the at least one DLL file from the list of DLL files in the database, executing the called DLL file in a conventional manner.

* * * * *